(12) United States Patent
Kita et al.

(10) Patent No.: US 7,438,168 B2
(45) Date of Patent: Oct. 21, 2008

(54) CUSHION PLATE

(75) Inventors: Akihiko Kita, Anjo (JP); Shigeo Tsuzuki, Anjo (JP); Hiroyuki Nozaki, Anjo (JP); Yukitoshi Ogawa, Toyota (JP); Takayuki Ishikawa, Toyota (JP); Hironobu Imaizumi, Aikoh-gun (JP)

(73) Assignees: Aisin AW Co., Ltd. (JP); Toyota Jidosha Kabushiki Kaisha (JP); NHK Spring Co., Ltd. (JP)

( * ) Notice: Subject to any disclaimer, the term of this patent is extended or adjusted under 35 U.S.C. 154(b) by 0 days.

(21) Appl. No.: 12/007,732

(22) Filed: Jan. 15, 2008

(65) Prior Publication Data

US 2008/0116029 A1 May 22, 2008

Related U.S. Application Data

(63) Continuation of application No. 11/136,604, filed on May 25, 2005, now abandoned.

(30) Foreign Application Priority Data

Jun. 1, 2004 (JP) .............................. 2004-163896

(51) Int. Cl.
  *F16D 25/0638* (2006.01)
(52) U.S. Cl. ................................ 192/85 AA; 192/109 F
(58) Field of Classification Search .............. 192/109 A
  See application file for complete search history.

(56) References Cited

U.S. PATENT DOCUMENTS

| 3,250,349 | A | 5/1966 | Byrnes et al. |
| 4,371,066 | A | 2/1983 | Fujoka et al. |
| 5,480,361 | A | 1/1996 | Murakami et al. |
| 5,857,666 | A | 1/1999 | Zhi-Peng et al. |
| 5,893,445 | A | 4/1999 | Dover |
| 2005/0217964 | A1 | 10/2005 | Asahina et al. |

FOREIGN PATENT DOCUMENTS

| JP | 10-246249 | 9/1998 |
| JP | 2003247564 A | 9/2003 |

*Primary Examiner*—Richard M Lorence
(74) *Attorney, Agent, or Firm*—Bacon & Thomas, PLLC

(57) ABSTRACT

A cushion plate is provided, for example, between a piston of a hydraulic servo and an adjacent friction plate in a frictional engagement element of an automatic transmission. The cushion plate is deflected by a pressing force of the piston to absorb an engagement shock. The cushion plate includes a main body portion formed into a belleville-spring shape, and a plurality of pawls that extend from the outer periphery of the main body for spline engagement with a member that is splined to, for example, the friction plate. A side wall of each pawl is formed with a curved recess extending circumferentially of the cushion plate and located adjacent the juncture (base) of the pawl at the outer periphery of the main body.

3 Claims, 7 Drawing Sheets (a)

(b)

(a)

(b)

(a)

(b)

CUSHION PLATE

CROSS-REFERENCE TO RELATED APPLICATIONS

This application is a continuation of U.S. application Ser. No. 11/136,604, filed May 25, 2005 and now abandoned, and claims priority of Japanese Patent Application No. 2004-163896 filed Jun. 1, 2004. The disclosure of Japanese Patent Application No. 2004-163896 filed on Jun. 1, 2004 and the disclosure of U.S. application Ser. No. 11/136,604, filed May 25, 2005, including the specification, drawings and abstract of each, are incorporated herein by reference in their entirety.

BACKGROUND OF THE INVENTION

1. Field of the Invention

The present invention relates to a cushion plate used as a buffer in a multi-plate frictional engagement element provided in, for example, an automatic transmission of a vehicle. Specifically, the present invention relates to a cushion plate in which stress concentration is reduced when it is deflected.

2. Description of the Related Art

Vehicular automatic transmissions utilize a multi-plate clutch or a multi-plate brake for changing a power transmission path within the transmission mechanism. In the multi-plate clutch or brake, movement of a piston of a hydraulic servo (actuator) is controlled based on the pressure of oil supplied from, for example, a hydraulic (oil pressure) controller, thereby pressing or releasing a friction plate unit and engageing or disengaging the clutch or brake. The clutch or brake has a cushion plate shaped like a belleville-spring between the piston and the friction plate unit. When the clutch or the brake is engaged, the cushion plate is deflected to absorb engagement shock (see, for example, Japanese Patent Application Laid Open No. 10-246249).

However, the cushion plate may be dragged with the friction plate of the clutch, the brake or the like, by flow of the lubrication oil in the direction of rotation. Furthermore, for example when the cushion plate is used in a clutch, it may rotate relative to the clutch drum. That is, the cushion plate may be abraded undesirably by friction with an adjacent member rotating relative to the cushion plate.

Therefore, it is preferable that, for example, pawls $101b$ be integral with and extend from the body $101a$ of the cushion plate 101 as shown in FIG. 4($a$) and FIG. 4($b$), and that the friction plate $41a$ adjacent the cushion plate 101 be in spline engagement with the cushion plate 101 via a spline $4s$, as shown in FIG. 5($a$).

However, as shown in FIG. 5($b$), when piston 43 of a hydraulic servo moves in the direction indicated by arrow A, the belleville-spring shaped cushion plate 101 is pushed toward the adjacent friction plate $41a$, and is deflected. As the cushion plate 101 is compressed in this manner, it is extended radially outward as indicated by arrow B, and the plate body $101a$ receives a turning force as indicated by arrow $\omega 1\text{-}\omega 2$ shown on FIG. 4($b$). In other words, a circumferential direction tensile stress is generated in the outer peripheral portion of the cushion plate 101. Thus, a maximum stress $\sigma y max$, greater than the average stress $\sigma yn$, is generated as a concentrated stress shown as stress distribution of a cross section y-y in FIG. 4($b$). In other words, a relatively large stress concentration occurs at base portions $101g$ of the pawls $101b$, adversely affecting durability.

Furthermore, as shown in FIG. 6, for example, if an arc at a base portion $101g'$ of a cushion plate $101'$ is enlarged in order to reduce stress concentration, the base portion $101g'$ may undesirably contact a corner $4sa$ of the spline $4s$, thereby reducing the contact area between side surface $101f'$ of a pawl $101b'$ and a side surface $4sb$ of the spline $4s$. Such a small contact area is undesirable when, for example, the cushion plate $101'$ receives a large rotational force.

Moreover, as shown in FIG. 7($a$) and FIG. 7($b$) for example, if a plate body $201a$ of a cushion plate 201 has recesses $201c$ extending radially inward at a base portion $201g$ of pawls $201b$, it is possible to increase the size of an arc at the base portion $201g$. However, since tensile stress is generated in the circumferential direction as indicated by the arrow $\omega 1\text{-}\omega 2$, a maximum stress $\sigma z max$ (which is larger than the maximum stress $\sigma y max$) and average stress $\sigma zn$, are created in an area of stress concentration shown as a cross section z-z. In other words, a relatively large concentration of stress occurs at the recess portions $201c$.

SUMMARY OF THE INVENTION

Accordingly, It is an object of the present invention to provide a cushion plate having pawls and designed to prevent abrasion, in which stress concentration at a base portion of the pawls is reduced.

According to a first aspect of the present invention, a curved recess is formed at a base portion of a pawl so as to create a circumferentially extending indentation, thereby reducing concentration of stress at the base portions of the pawls and improving durability of the cushion plate.

According to a second aspect of the present invention, the recesses are formed radially outward of the outer periphery of the plate main body, thereby avoiding a reduction in the radial dimension of the plate body. Thus, it is possible to prevent generation of a relatively large concentration of stress at the base portions of the pawls and, accordingly, the durability of the cushion plate is improved.

According to a third aspect of the present invention, the pawl is inclined in the direction from which the plate body is pressed. Therefore, when the plate body is pressed, it is possible to prevent the pawl from bending relative to the plate body. Thus, the circumferentially extending recesses prevent generation of stress at the base portion where the width of the pawl is smallest. Accordingly, the durability of the cushion plate is improved.

According to a fourth aspect of the present invention, the cushion plate is incorporated into a multi-plate frictional engagement element of an automatic transmission. Therefore, it is possible to absorb shock of engagement in the automatic transmission. Furthermore, since the pawl is splined to a member on the outer peripheral side, rotation relative to an outer friction plate is prevented. Thus, it is possible to prevent abrasion of the cushion plate.

According to a fifth aspect of the present invention, the cushion plate is incorporated into a multi-plate brake.

BRIEF DESCRIPTION OF THE DRAWINGS

FIGS. 5(a) and 5(b) illustrate operation of the hydraulic servo and the cushion plate, wherein FIG. 5(a) is a view showing the released state, and FIG. 5(b) is a view showing the engaged state;

DETAILED DESCRIPTION OF THE PREFERRED EMBODIMENTS

Figure 1:
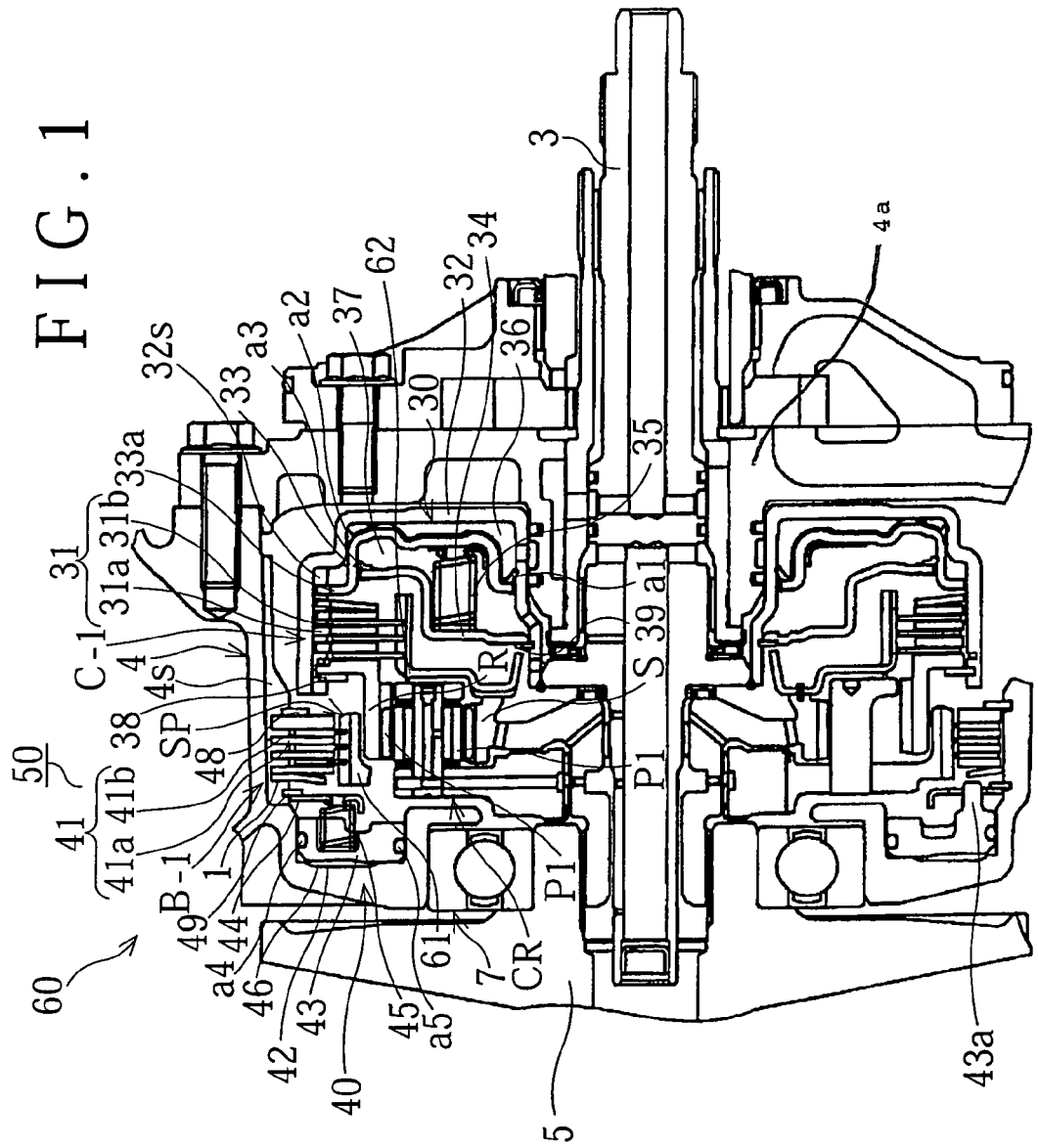
FIG. 1 is a cross-sectional view, with partial omissions, of an example of an automatic transmission to which a cushion plate according to the present invention is applied.

Hereinafter, an embodiment according to the present invention will be described with reference to the drawings. Firstly, an example of an automatic transmission to which the present invention is applied will be described briefly with reference to FIG. 1. As shown in FIG. 1, a belt-type continuously variable transmission (CVT) 50 is provided with, for example, an input shaft 3 and a pulley mechanism. Drive rotation is input from an engine to the input shaft 3 through a torque converter (not shown) or the like. The pulley mechanism includes a metal belt (not shown) held between a primary pulley 5 and a secondary pulley (not shown). The primary pulley 5 is supported by a transmission case 4 (a member on the outer periphery) through a ball bearing 7. The rotational speed of the primary pulley 5 is changed continuously by altering the pulley width, and the rotation as changed is output to the drive wheels through the secondary pulley. The belt-type CVT 50 has a forward/reverse switching device 60 interposed in the power transmission path between the primary pulley 5 and the input shaft 3. The forward/reverse switching device 60 switches the rotation of the input shaft 3 between forward rotation and reverse rotation, and outputs the switched rotation.

The forward/reverse switching device 60 is disposed in the transmission case 4, and includes a planetary gear unit SP, a multi-plate forward movement clutch C-1 and a multi-plate reverse movement brake (i.e. a multi-plate frictional engagement element) B-1 respectively provided around the input shaft 3. The planetary gear unit SP includes a sun gear S, a ring gear R, and a carrier CR. The sun gear S is rotatably supported on the input shaft 3 and is coupled to the primary pulley 5. The ring gear R is coupled to a clutch drum 32 as described below. The carrier CR has a pinion P1 meshing with the ring gear R and the sun gear S.

The forward movement clutch C1 has a friction plate unit 31 and a hydraulic servo 30. The friction plate unit 31 includes a plurality of outer friction plates 31a and inner friction plates 31b. The hydraulic servo 30 controls the state of engagement of the friction plate unit 31. The hydraulic servo 30 includes the clutch drum 32, a piston 33, a cancellation plate 34, and a return spring 35, which form an oil chamber 36 and a cancellation oil chamber 37. The clutch drum 32 is rotatably supported by a lid member 4a fixed to the transmission case 4, and an inner peripheral annular end portion of the clutch drum 32 is coupled to the input shaft 3. Splines 32s are formed on the inner surface of the outer peripheral side annulus of the clutch drum 32 and the outer friction plates 31a and the ring gear R are in spline engagement therewith. The axial position of the ring gear R is fixed by a snap ring 38 and the rotation of the input shaft 3 is constantly input to the ring gear R.

The piston 33 is axially movable relative to the clutch drum 32. A portion 33a of the piston 33 is in spline engagement with the spline 32s. A pressing portion 33a is provided facing the friction plate unit 31 to apply a pressing (engaging) force thereto. Seal rings a1 and a2 form the oil tight oil chamber 36 between the piston 33 and the clutch drum 32. The return plate 34 is prevented from axial movement by a snap ring 39 fitted in the outer surface of the inner cylindrical portion of clutch drum 32. The return spring 35 is compressed between the return plate 34 and the piston 33, and seal rings a1 and a3 form the cancellation oil chamber 37. Furthermore, the inner friction plates 31b, provided between adjacent outer friction plates 31a, (and the ring gear R) are splined to a hub member 62. The hub member 62 is coupled to the sun gear S.

Thus, when working oil is supplied from the hydraulic controller (not shown) to the oil chamber 36, the piston 33 presses against the friction plate unit 31, and the forward movement clutch C-1 is engaged. Thus, the rotation of the input shaft 3 is transmitted to the primary pulley 5 through the clutch drum 32, the friction plate unit 31, the hub member 62, and the sun gear S. The rotational speed of the input shaft 3 is changed in a stepless manner by the pulley mechanism, and rotation at that changed speed is transmitted to the drive wheels as forward speed rotation.

Likewise, the reverse movement brake B-1 has a friction plate unit 41 and a hydraulic servo 40. The friction plate unit 41 includes a plurality of outer friction plates 41a and inner friction plates 41b. The hydraulic servo 40 controls the engagement state of the frictional plate unit 41. The hydraulic servo 40 includes a cylinder 42, a piston 43, a cancellation plate 44, and a return spring 45, which form an oil chamber 46. The cylinder 42 is formed in an inner surface of the transmission case 4. The piston 43 is slidably mounted within the cylinder 42 for axial movement therein. The piston 43 has an extended portion 43a extending toward and facing the friction plate unit 41 for applying a pressing force thereto. Seal rings a4 and a5 form an oil tight oil chamber 46 between the piston 43 and the cylinder 42. The return plate 44 is prevented from axial movement by a snap ring 49 fitted in the inner peripheral surface of the transmission case 4. The return spring 45 is compressed between the return plate 44 and the piston 43.

The outer friction plates 41a are in spline engagement with a spline 4s formed on the inner peripheral surface of the transmission case 4. Furthermore, one of outer friction plates 41a, that friction plate furthest opposite the piston 43, is prevented from axial movement by a snap ring 48 fitted in the inner peripheral surface of the transmission case 4. Moreover, the inner friction plates 41b provided between adjacent outer friction plates 41a (alternating therewith) are splined to a hub member 61 (a member on the radially inner side). The hub member 61 is integrally coupled to the carrier CR.

Thus, when working oil is supplied from the hydraulic control unit to the oil chamber 46, the piston 43 presses the friction plate unit 41, and the reverse movement brake B-1 is engaged. The carrier CR, through the hub member 61, is held against rotation relative to the transmission case 4. Thus, while the rotation of the input shaft 3 is constantly inputted to the ring gear R through the clutch drum 32, the rotation of the ring gear R is reversed through the pinion P1 of the fixed carrier CR, output to the sun gear S, and transmitted to the primary pulley 5. The rotational speed of the input shaft 3 is changed in a stepless manner by the pulley mechanism, and rotation at the changed speed is transmitted to the drive wheels as reverse speed, speed-changed rotation.

A cushion plate 1 according to the present invention is positioned axially between the edge (pressing) portion 43a of the piston 43 and the one of the outer friction plates 41*a* nearest the piston 43. Note that in the embodiment of the present invention (described here), the cushion plate 1 is described as being used in the reverse movement brake B-1. Of course, the cushion plate 1 may also be used in the forward movement clutch C-1, and in any other frictional engagement mechanism, without limitation.

Figure 2:
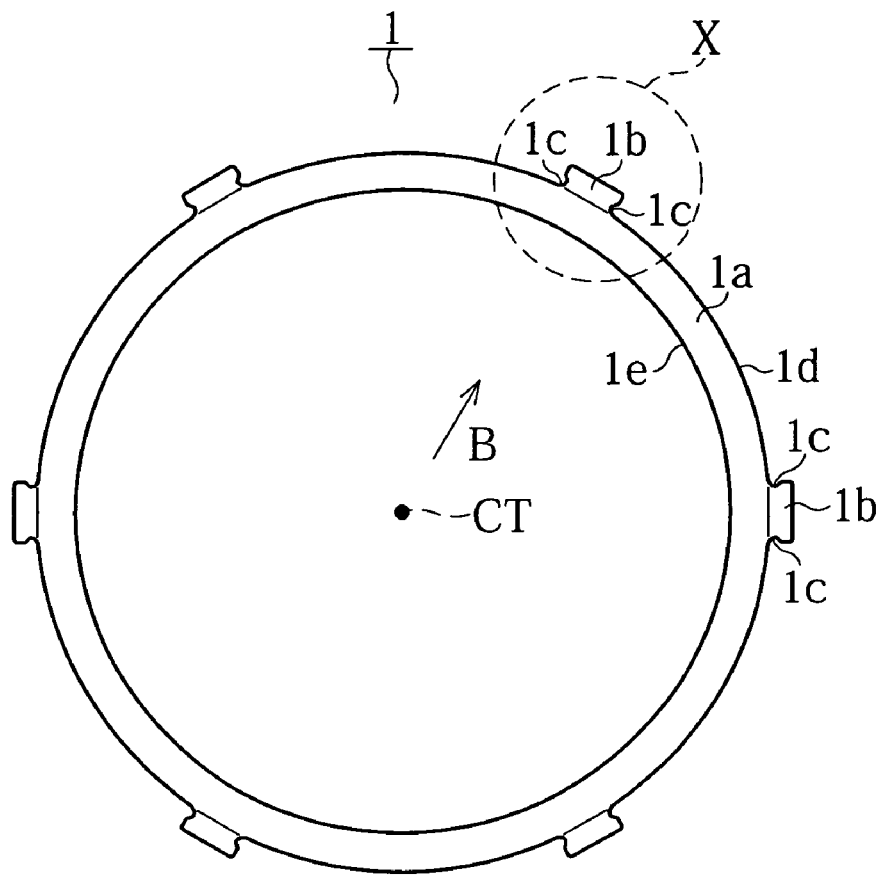
FIG. 2($a$) is a front view of the cushion plate according to the present invention, and FIG. 2($b$) is an enlarged view of a portion X in FIG. 2($a$)
Figure 2:
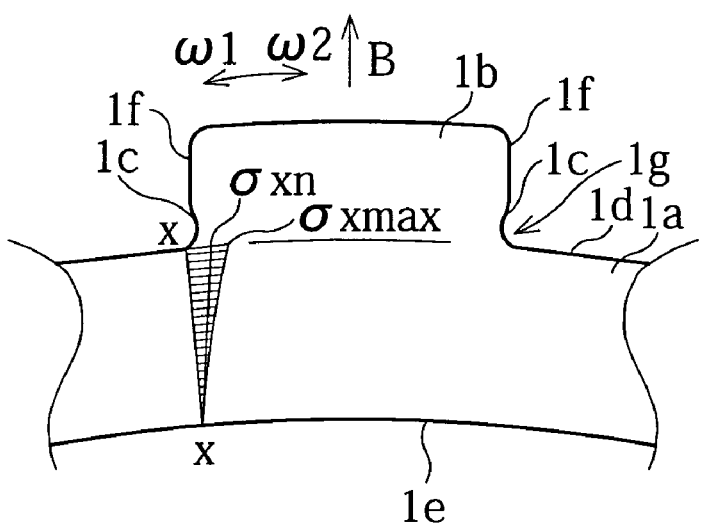

The cushion plate 1 according to the present invention is shown in FIG. 2(*a*) as including a plate body 1*a* defining a central axis CT, and a plurality of pawls 1*b* for spline engagement with the spline 4*s* formed on the inner peripheral surface of the transmission case 4. For example, six pawls 1*b* may be provided at equal circumferential spacings. The plate body 1*a* is formed as an annular disk. When no load (pressing force) is applied to the plate body 1*a*, the plate body 1*a* is inclined so that its outer peripheral portion 1*d* is extended toward the outer friction plates 41*a*, and its inner peripheral portion 1*e* is extended toward the piston 43 (see FIG. 1). That is, the plate body 1*a* is shaped as a so-called belleville-spring.

As shown in FIG. 2(*b*), each of the pawls 1*b* is formed integrally on the plate body 1*a*, and extends radially outwardly from the outer peripheral portion 1*d* of the plate body 1*a*. When viewed from the front, each of the pawls 1*b* has a rectangular shape with side surfaces 1*f*. Curved recesses 1*c* are formed at the radially innermost ends of side surfaces 1*f*, i.e., on both sides 1*g* of each of the pawls 1*b*. The recesses 1*c* create circumferential indentations as indicated by an arrow ω1-ω2. The curved shape of the circumferential indentations indicated by the arrow ω1-ω2, i.e., the recess portions 1*c* may have a generally semicircular shape, a generally oval shape, or any other, more complicated shape. It is preferred that the recess portions 1*c* do not extend radially inward from the outer peripheral portion 1*d* of the plate body 1*a*.

Figure 3:
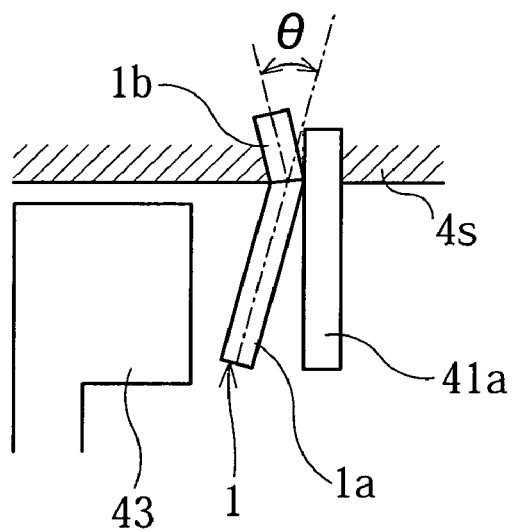
FIGS. 3($a$) and 3($b$) illustrate operation of the cushion plate according to the present invention, wherein FIG. 3($a$) is a view showing the state where a hydraulic servo is released, and FIG. 3($b$) is a view showing the state where the hydraulic servo is engaged.
Figure 3:
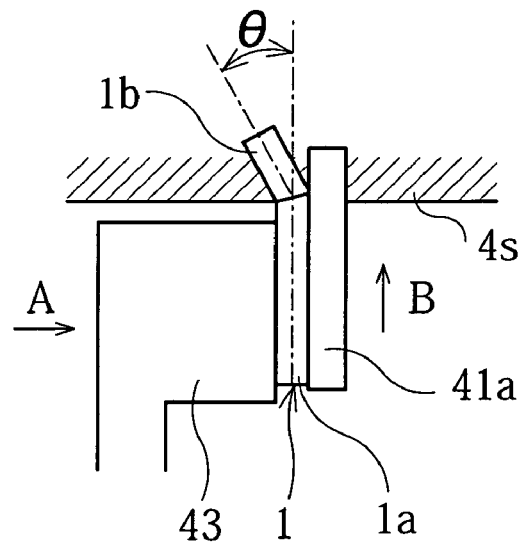
Figure 4:
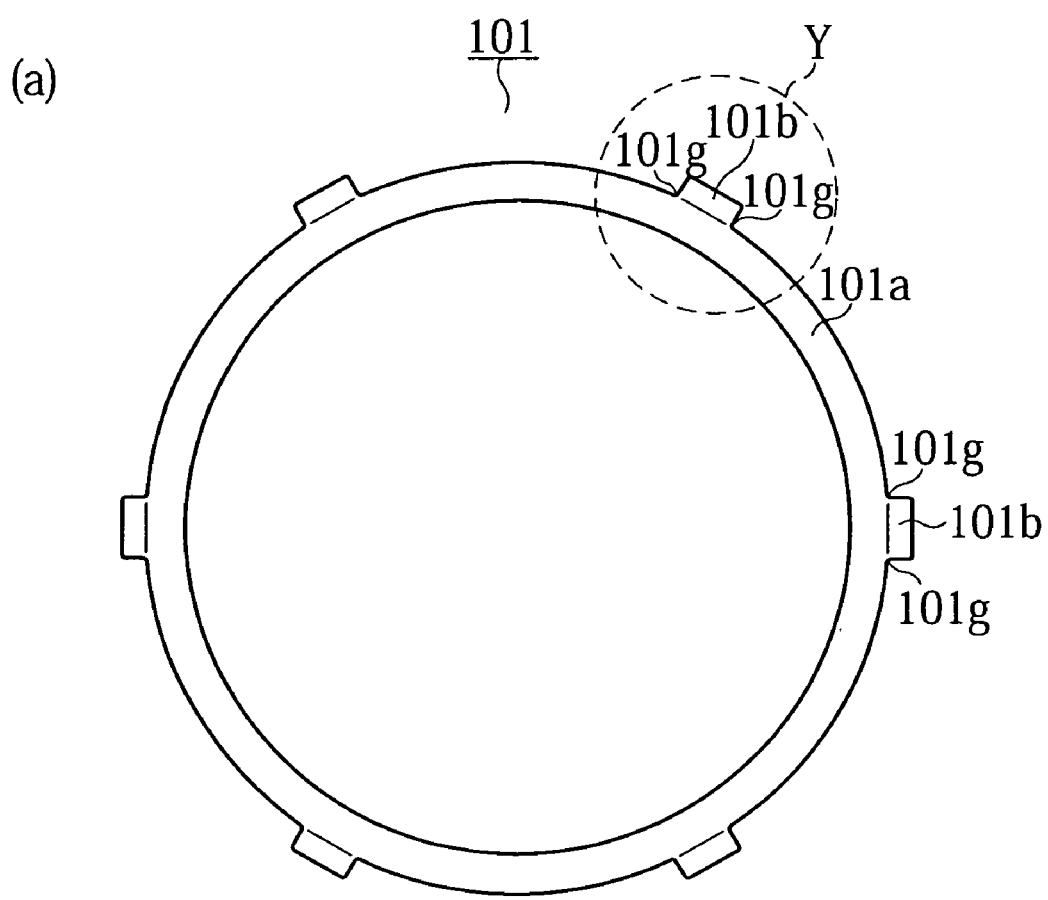
FIG. 4(a) is a front view of a cushion plate provided with pawls and FIG. 4(b) is an enlarged view of a portion Y in FIG. 4(a)
Figure 4:
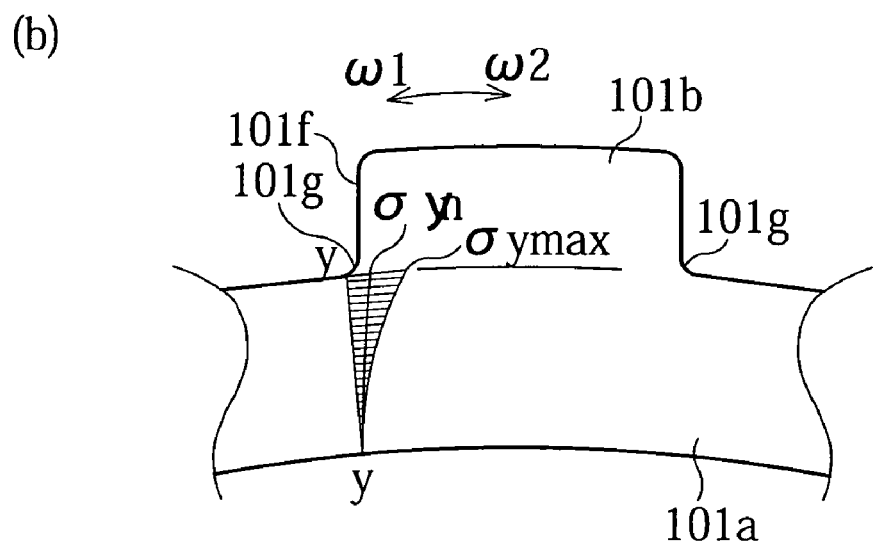
Figure 5:
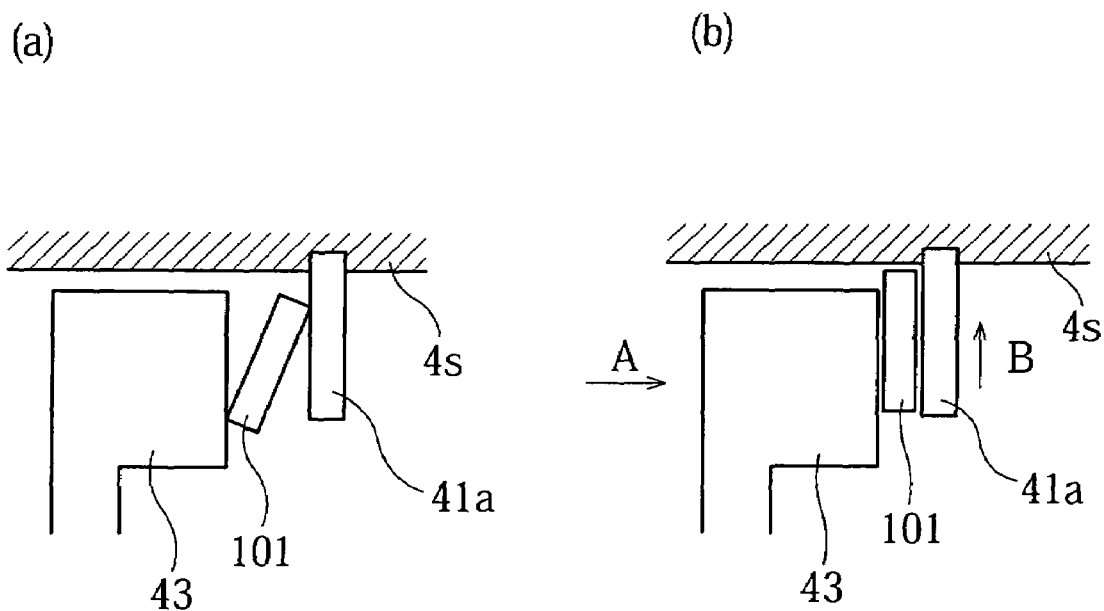
Figure 6:
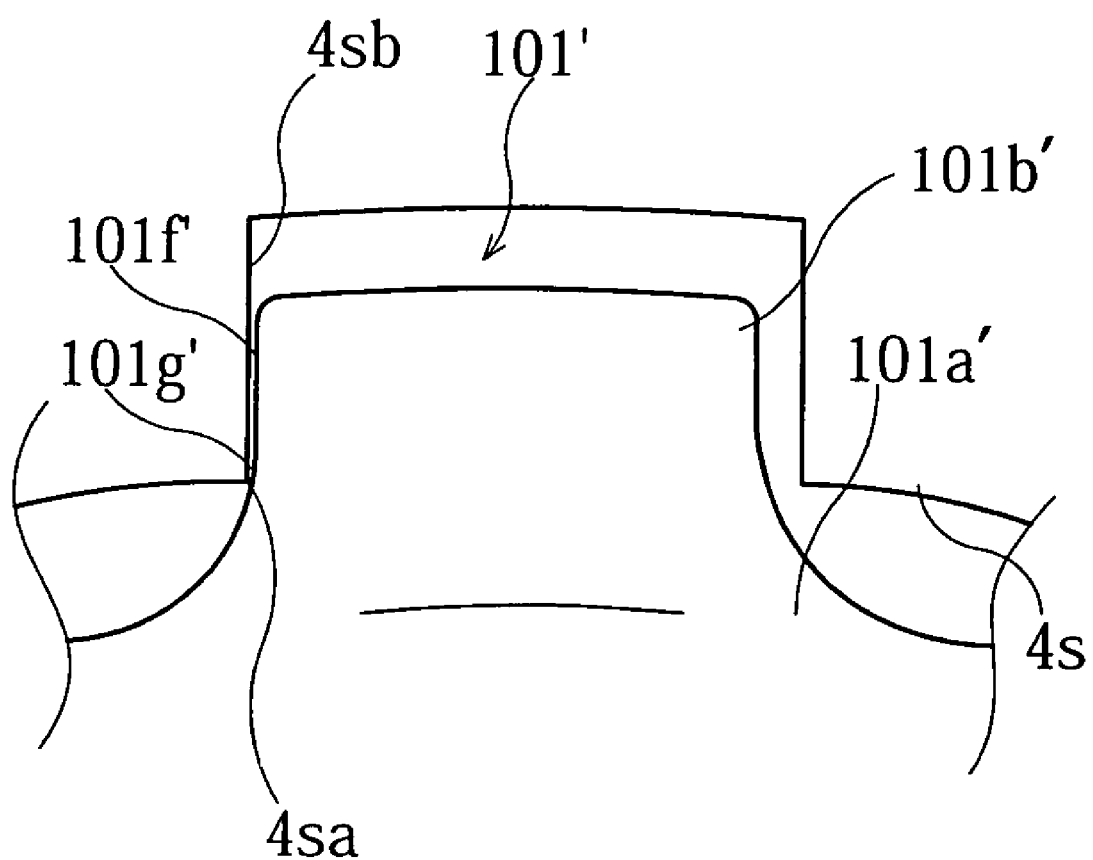
FIG. 6 is an enlarged view of an arc at a base portion of a pawl.
Figure 7:
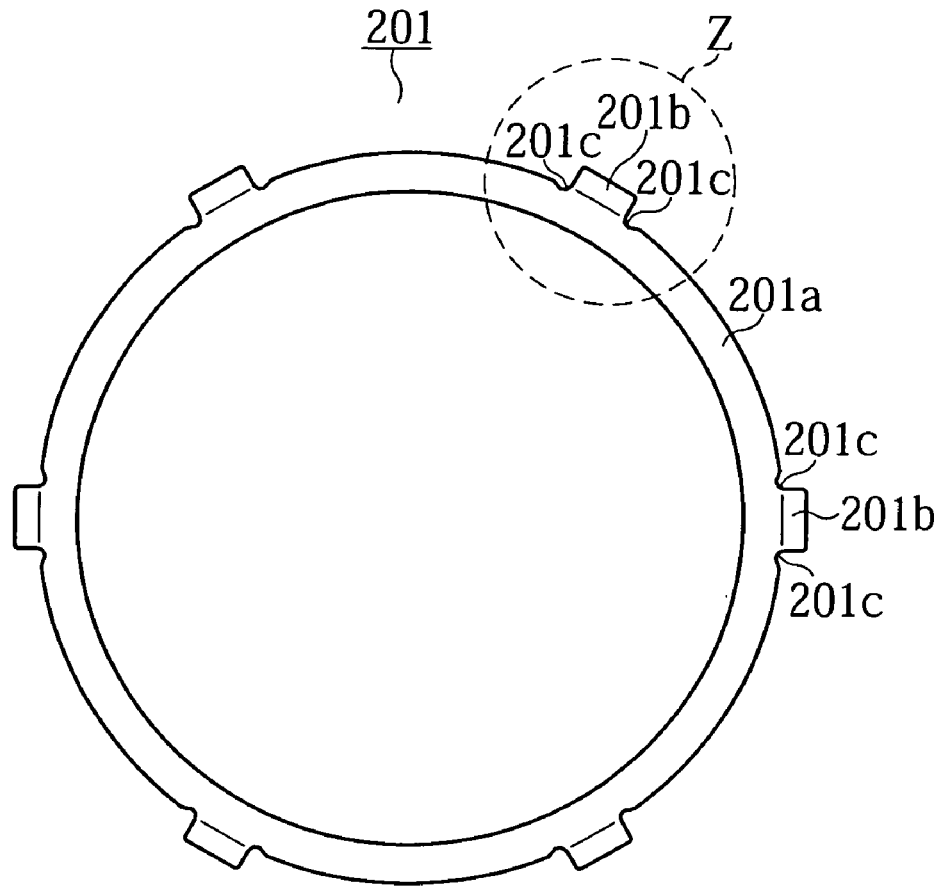
FIG. 7(a) is a front view of a cushion plate provided with recesses extending radially inward and FIG. 7(b) is an enlarged view of a portion Z in FIG. 7(a).
Figure 7:
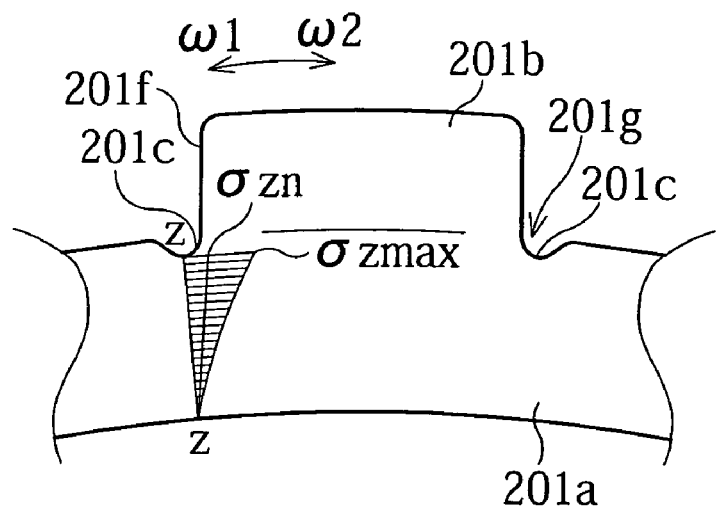

As shown in FIG. 3(*a*), each of the pawls 1*b* is formed so as to incline at a predetermined angle θ from the plate body 1*a* toward the piston 43 (i.e., in the direction from which the plate body 1*a* is pressed). The predetermined angle θ is determined such that the pawl 1*b* does not contact the adjacent friction plate 41*a* when the reverse movement brake B-1 is released as shown in FIG. 3(*a*), and such that the pawl 1*b* will remain engaged with the spline 4*s* on the inner peripheral surface of the transmission case 4 when the reverse movement brake B-1 is engaged as shown in FIG. 3(*b*).

Next, operation of the cushion plate 1 will be described with reference to engagement and release of the reverse movement brake B-1. As shown in FIG. 3(*a*), when the reverse movement brake B-1 is released, the piston 43 does not press against the cushion plate 1 (the piston 43 is spaced from the cushion plate 1). Furthermore, the pawl 1*b* of the cushion plate 1 is engaged with the spline 4*s* on the inner peripheral surface of the transmission case 4, and the outer friction plate 41*a* nearest the piston 43 is also engaged with the spline 4*s*. Therefore, even with a flow of lubrication oil in the direction of rotation, the cushion plate 1 will not rotate relative to the outer friction plate 41*a* or to the spline 4*s* (i.e., the transmission case 4), and thus, no abrasion occurs.

Moreover, even if a large turning force (torque) is applied to the cushion plate 1 in the direction of rotation, the recesses 1*c* in the side surfaces 1*f* of the pawls 1*b* provide the pawls 1*b* with a sufficient length to establish a large contact area with the spline 4*s* and to sufficiently resist rotational force.

Note the lack of relative rotation between the cushion plate 1 and the piston 43, even with the piston 43 in contact with the cushion plate 1 since the piston 43 does not normally rotate. Therefore, no abrasion occurs in this case either. Further, when the cushion plate 1 is used in the clutch, since the cushion plate 1 and the outer friction plates are normally in spline engagement with the clutch drum, the cushion plate 1, the outer friction plates, and the piston rotate integrally with the clutch drum, and no relative rotation and no abrasion occur in this case either.

As shown in FIG. 3(*b*), when the reverse movement brake B-1 is engaged, drive of the piston 43 is controlled by the pressure of the oil supplied to the oil chamber 46, and the piston moves axially as indicated by arrow A, thereby pressing the cushion plate 1 in the direction indicated by the arrow A. Thus, the cushion plate 1 is deflected by a pressing force (a clamping force) between the piston 43 and the adjacent friction plate 41*a*. The pressing force of the piston 43 is received by a snap ring 48, the outer friction plate 41*a*, and the inner friction plate 41*b* (see FIG. 1).

When the cushion plate 1 is deflected by the pressing force of the piston 43, the inner peripheral portion 1*e* of the plate body 1*a* is pushed inwardly in the direction indicated by the arrow A. Thus, the plate body 1*a* is pushed in the direction indicated by arrow B, i.e., radially outward from the central axis CT, and the outer periphery 1*d* is turned as indicated by the arrow ω1-ω2. Consequently, tensile stress is generated in the circumferential direction as indicated by the arrow ω1-ω2 at the base portions 1*g* of each of the pawls 1*b*. A maximum stress σxmax, with an average stress σxn, is generated as shown in the stress distribution of cross section x-x in FIG. 2(*b*). However, since the recesses 1*c* extend in the circumferential direction, as indicated by the arrow ω1-ω2, the stress concentration at the base portions 1*g* of each of the pawls 1*b* is reduced (that is, the maximum stress σxmax becomes smaller than a maximum stress σymax and smaller than a maximum stress σzmax).

Furthermore, because each of the pawls 1*b* is inclined at the predetermined angle θ, from the plate body 1*a* toward the piston 43, the pawls 1*b* are not bent by the pressing force of the piston 43. In other words, although the circumferentially extending recesses 1*c* at the base portions 1*g* of the pawls 1*b* reduce the circumferential width of the base portions 1*g*, because the pawls 1*b* do not bend it is possible to prevent concentration of stress at the base portions 1*g*.

As described above, in the cushion plate 1 according to the present invention, the curved recesses 1*c* formed at the base portions 1*g* of the pawls 1*b*, are in the form of circumferentially extending indentations. Thus, the splined engagement of the pawls 1*b* prevents rotation relative to the friction plates 41, the spline 4*s* on the inner peripheral surface of the transmission case 4, and the piston 42. This lack of relative rotation prevents abrasion of the cushion plate while reducing stress concentration at the base portions 2*g* of the pawls 1*b*, thereby improving the durability of the cushion plate 1. Moreover, a larger contact area is provided between the pawls 1*b* and the spline 4*s*. Thus, even if, for example, a large rotational force is applied to the cushion plate 1, the force can be sufficiently withstood.

Furthermore, since the recesses 1*c* are positioned outwardly from the outer periphery 1*d* of the plate body 1*a*, it is possible to eliminate a narrowing of the width of the plate body 1*a*, i.e., the radial dimension indicated by the arrow B. Thus, it is possible to prevent generation of a relatively large stress concentration at the base portions 1*g* of the pawls 1*b*. Accordingly the durability of the cushion plate 1 is improved.

Moreover, since the pawls 1*b* are inclined from the plate body 1*a* toward the piston 43 in the direction from which the plate body 1*a* is pressed, the pawls 1*b* are prevented from bending with respect to the plate body 1*a* when the plate body 1*a* is pressed. Thus, circumferentially extending recesses 1*c* prevent stress concentration at the base portions 1*g*. Accordingly, the durability of the cushion plate 1 is improved.

Furthermore, since the cushion plate 1 is used in the brake B-1 of the automatic transmission 50, it is possible to absorb shock of engagement in the automatic transmission 50.

In the embodiment described above, the cushion plate 1 according to the present invention is used in the reverse movement brake B-1 of the belt-type CVT 50. As a matter of course, the cushion plate 1 is also applicable in the same way to any multi-plate frictional engagement element of any automatic transmission.

Furthermore, although the above-described cushion plate 1 is shown as having pawls 1*b* at six locations, any number of pawls may be provided, if adapted to engage splines on the interior of the transmission case.

In the above-described embodiment, a configuration where the recesses 1*c* create circumferentially extending indentations at the bases 1*g* on both sides of the pawls 1*b* has been described as preferred. However, the scope of the resent invention also includes a structure wherein recesses are formed only in one location at the base of the pawl.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A multi-plate frictional engagement element for an automatic transmission comprising:

a piston controlled by oil pressure for axial movement;

an outer friction plate in splined engagement with a member on an outer peripheral side of the element;

an inner friction plate in splined engagement with a member on an inner peripheral side of the element, the outer friction plate and the inner friction plate being axially arranged and pressed into frictional contact by the piston, so that the member on the outer peripheral side and the member on the inner peripheral side become mutually engaged;

a cushion plate provided axially between the piston and the outer friction plate, the cushion plate comprising:

a main annular plate body portion defining an outer periphery;

a pawl extending radially outward from the outer periphery of the main body and splined to the member on the outer peripheral side, said pawl having opposing side walls extending radially outward from a base joined to the periphery of the main body and a curved recess in at least one side wall, said curved recess located adjacent the base, radially outward of the periphery of the main body, and extending circumferentially of the main body.

2. The multi-plate frictional engagement element according to claim 1 wherein the pawl is inclined in the direction from which the main body is pressed.

3. The multi-plate frictional engagement element according to claim 1, wherein the member on the outer peripheral side is a case of the automatic transmission, and the multi-plate frictional engagement element is a multi-plate brake that fixes the member on the inner peripheral side against rotation relative to the case when engaged.

* * * * *